United States Patent [19]
Finkelstein

[11] 4,329,748
[45] May 18, 1982

[54] DOUBLE PANCAKE WATERBED MATTRESS

[75] Inventor: Alberto L. Finkelstein, Newbury Park, Calif.

[73] Assignee: Mollura Industries, City of Industry, Calif.

[21] Appl. No.: 165,710

[22] Filed: Jul. 3, 1980

[51] Int. Cl.³ .............................................. A47C 27/08
[52] U.S. Cl. .......................................... 5/451; 5/458; 156/309.6
[58] Field of Search ................... 5/451, 452, 457, 458, 5/449, 450; 156/309.6

[56] References Cited
U.S. PATENT DOCUMENTS
4,172,301 10/1979 Bubrard et al. .......................... 5/451

Primary Examiner—Alexander Grosz
Attorney, Agent, or Firm—Flam & Flam

[57] ABSTRACT

A stress free baffled waterbed mattress bag consists of an array of individual baffles, each of the baffles comprising a plurality of vertically stacked bladders serially connected, the end bladders being respectively attached to the operative top and bottom mattress bag layers. Each of the bladders comprises a pair of circular layers peripherally welded together and centrally attached respectively to the corresponding layer of the companion bladder and the top or bottom operative mattress layer.

5 Claims, 7 Drawing Figures

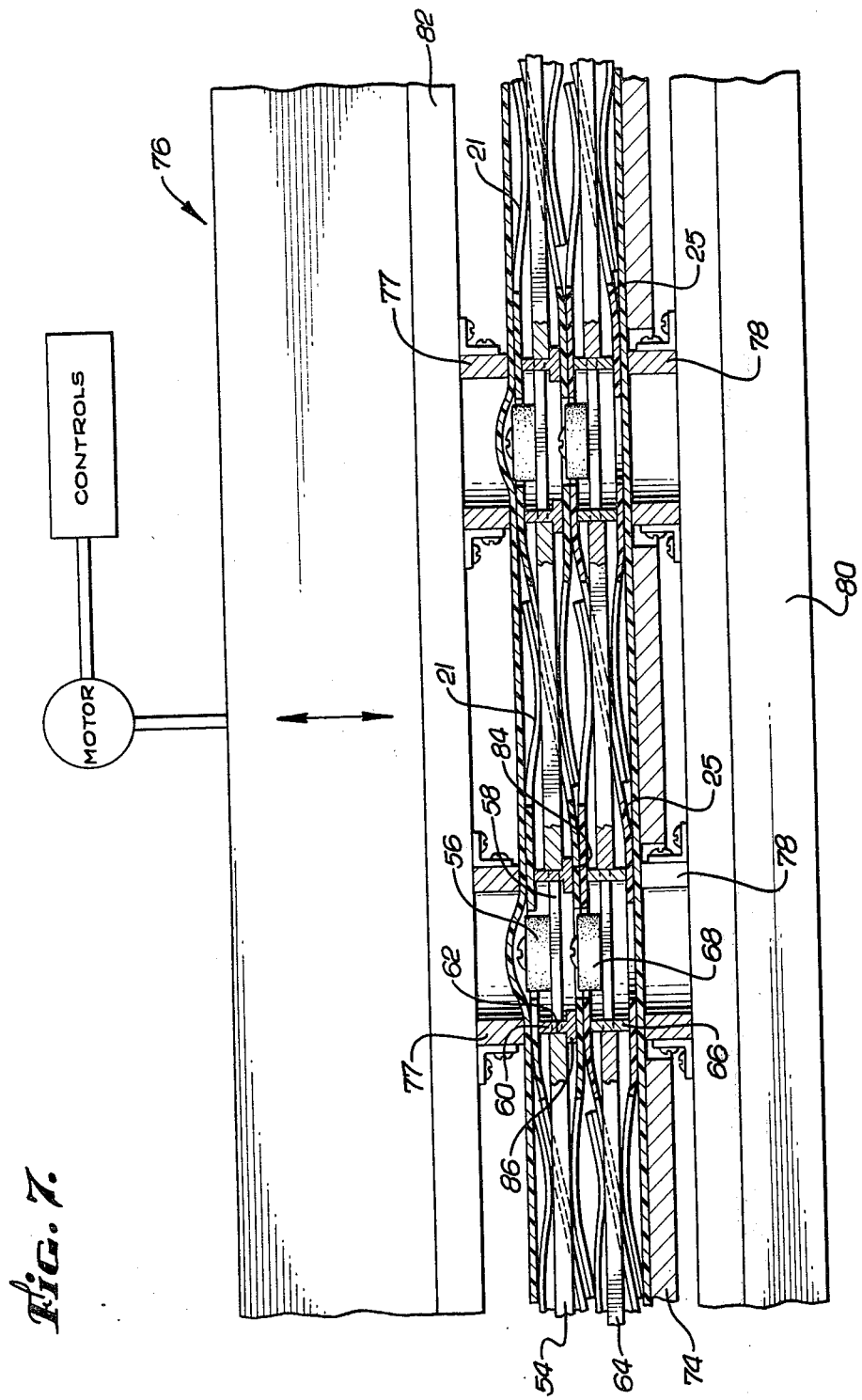

DOUBLE PANCAKE WATERBED MATTRESS

RELATED APPLICATION

This application is related to my copending Application, Ser. No. 53,398, filed June 29, 1979, entitled METHOD OF MAKING BAFFLED LAP WELDED WATERBED MATTRESS BAG now abandoned.

FIELD OF THE INVENTION

This invention relates to waterbed mattress bags and, particularly, to bags utilizing interior baffle structures of the type shown and described in U.S. Pat. No. 4,172,301, issued Oct. 30, 1979 to Lloyd D. Everard and Carlos A. Mollura, entitled FLUID FILLED BEDS AND THE LIKE.

BACKGROUND OF THE INVENTION

Waterbed mattress bags, unless abused, are expected to remain leak-proof for several years. Manufacturers' warranties for three and five year periods are not uncommon. In recent years, bags with interior baffle structures have become popular. One such commercially successful bag is shown and described in said Everard/Mollura patent. That bag has a series of baffles, each a bladder comprising a pair of juxtaposed generally circular plastic "pancakes" peripherally attached together and respectively attached at their central regions to the top and bottom bag layers. The attachment between the bag layers and the respective "pancakes" takes place at a generally circular weld. As the bag is filled with water, the "pancakes" separate and assume first, a biconical configuration, and then a configuration that approaches a fluted cylinder. If the bag is stressed, as by excessive filling or by dynamic loading due to body movement, the baffles assume the straight cylindrical form as they forcefully restrain the upper bag layer. The weld is stressed and a point of failure may develop.

Several solutions have been proposed. One solution is to utilize an interior ring die in the welding process shown and described in U.S. Pat. No. 4,167,432, issued Sept. 11, 1979 to Carlos A. Mollura, entitled PROCESS OF MAKING A WATERBED MATTRESS. The improvement is significant; yet, the danger of failure at the weld is still present even if largely reduced.

Another solution is to utilize oversized pancake bladders that provide a much increased range of separation at the center such that the bladders are never axially stressed whatever may be the static or dynamic load on the bag. The problem, however, is that in order to assemble the bladders as by an assembly jig, the center-to-center spacing of the pancake bladders must be increased. Increasing the center-to-center distance between the pancake bladders correspondingly increases the free spaces within the mattress bag with consequent decrease in wave damping.

The primary object of the present invention is to provide a new pancake bladder structure which is never axially stressed, all without compromising the wave damping characteristics of the mattress. Another object of the present invention is to provide a new pancake bladder structure of this kind which can conveniently be assembled by a simple jig structure.

SUMMARY OF THE INVENTION

In order to achieve a stress free baffled waterbed mattress bag, I provide an array of individual baffles each comprising a plurality of vertically stacked bladders serially connected, the end bladders being respectively attached to the operative top and bottom mattress bag layers. The degree of opening of the bladders is thereby reduced, since the expansion requirements of the bladders is divided among the bladder elements of the stack. The bladders never approach the full convoluted cylindrical stress configuration, even with significant bag overfill. Yet the bladders occupy the entire area of the mattress to ensure effective damping of water movement.

BRIEF DESCRIPTION OF THE DRAWINGS

A detailed description of the invention will be made with reference to the accompanying drawings wherein like numerals designate corresponding parts in the several figures. These drawings, unless described as diagrammatic or unless otherwise indicated, are to scale.

FIG. 7 is a partially diagrammatic fragmentary view illustrating the welding machine about to be closed on the jig and baffle elements

DETAILED DESCRIPTION OF THE PREFERRED EMBODIMENT

The following detailed description is of the best presently contemplated mode of carrying out the invention. This description is not to be taken in a limiting sense, but is made merely for purposes of illustrating the general principles of the invention, since the scope of the invention is best defined by the appended claims.

Figure 1:
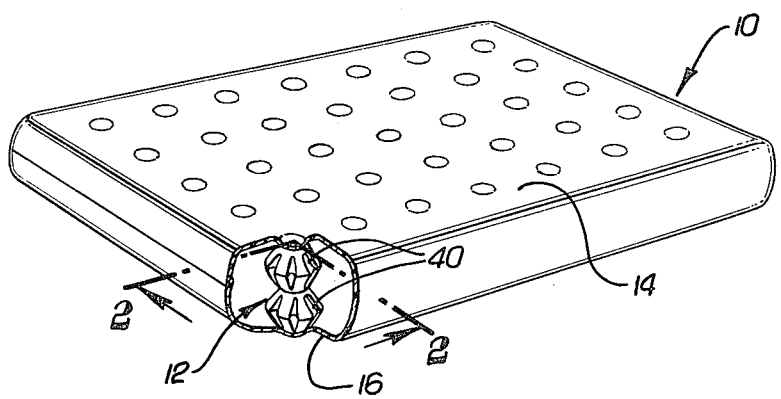
FIG. 1 is a perspective view of a waterbed mattress bag incorporating the present invention, a corner of the bag being broken away and shown in section.
Figure 2:
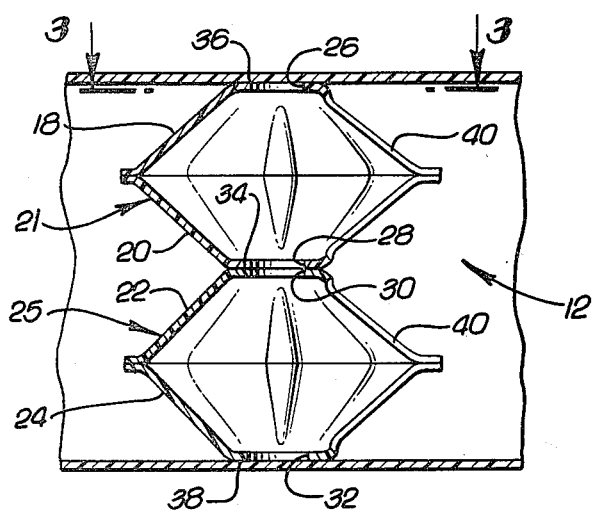
FIG. 2 is an enlarged fragmentary vertical sectional view of the mattress bag, and taken along a plane corresponding to line 2—2 of FIG. 1.
Figure 3:
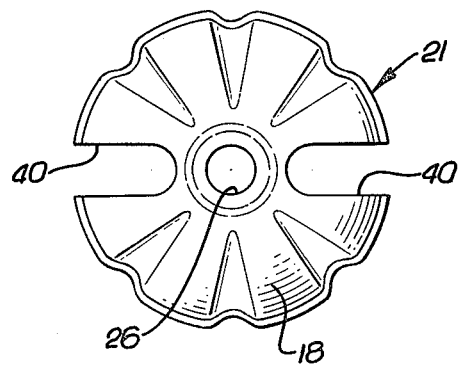
FIG. 3 is a top plan view of one of the two baffle elements of the baffle assembly.

The waterbed mattress bag 10 shown in FIG. 1 has, in the present instance, five rows of individual baffle assemblies 12, respectively attached directly or indirectly to the top and bottom layers 14 and 16 of the bag. The baffle assembly 12 comprises four juxtaposed circular layers 18, 20, 22 and 24 that form a bellows-like arrangement as shown in FIG. 2. The first two layers 18 and 20 are peripherally welded together and form a baffle element or bladder 21. The second two layers 22 and 24 likewise form a second baffle element or bladder 25. All of the layers have central circular openings 26, 28, 30 and 32 that form registers useful in assembly procedures hereinafter described. The layers 20 and 22 are attached at the center as by a circular weld 34. The top and bottom layers 18 and 24 are attached to the top and bottom bag layers as by circular welds 36 and 38.

The edges of the baffle elements have deep notches 40 on diametrically opposite sides. These notches 40 allow the baffle elements to be jigged for assembly purposes hereinafter described. Additionally, the notches 40 allow the fluid of the mattress bag to move relatively freely between the inside and the outside. Thus, no pressure differential exists under steady state conditions.

By virtue of the fact that the baffle assembly comprises a plurality of pancake bladder elements, the range of axial movement of the entire assembly is twice that of the single pancake bladder element. Hence, the bladder elements only slightly convolute and remain generally biconical, notwithstanding extreme overfill of the mattress bag and notwithstanding extreme flexure and upward movement of the top mattress bag layer under dynamic load conditions. Yet the bladder assembly is relatively small in diameter such that when arranged closely with other assemblies, effective wave damping is ensured.

Figure 4:
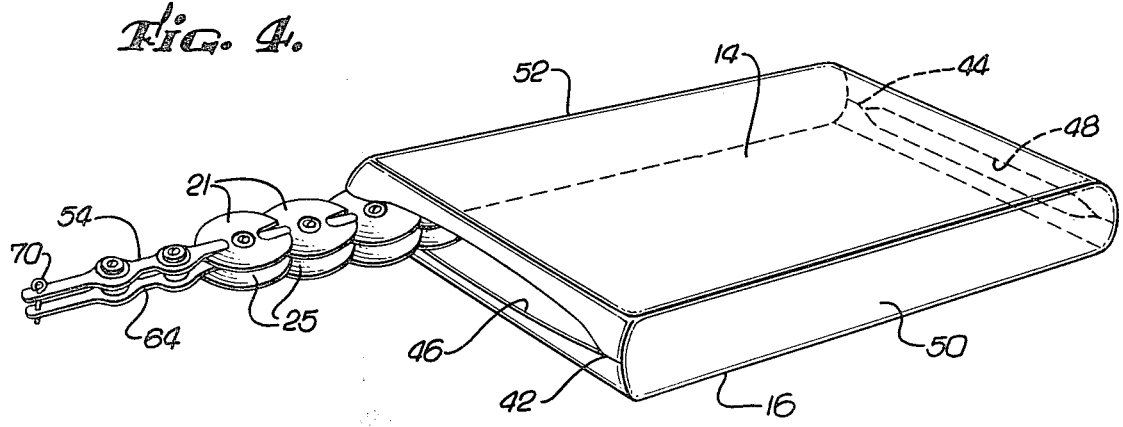
FIG. 4 is a perspective view illustrating diagrammatically, the use of a composite jig for placement of baffles inside the bag for welding.
Figure 5:
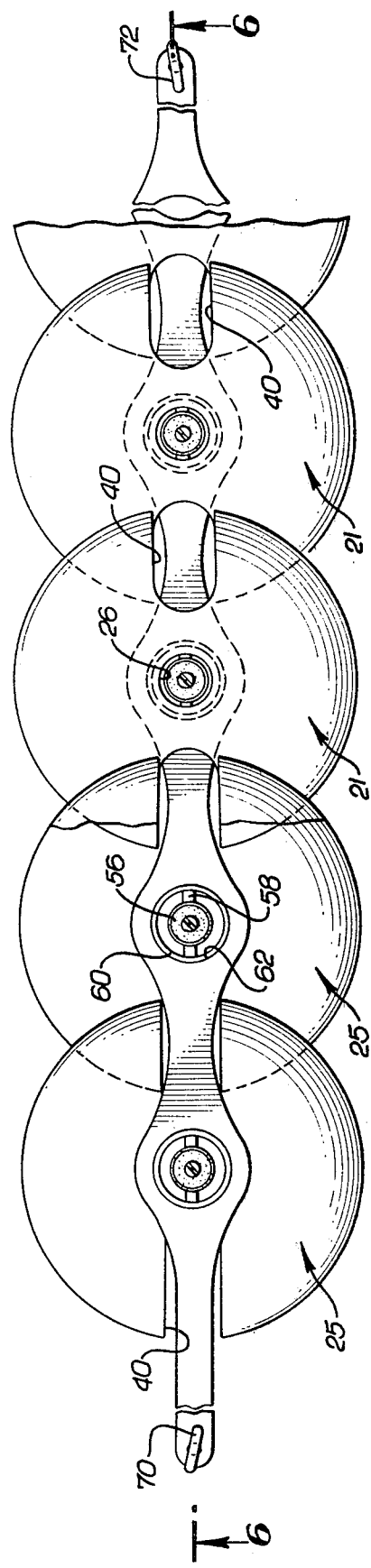
FIG. 5 is an enlarged fragmentary plan view of the welding jig, some of the baffle elements being shown in place on the jig.
Figure 6:
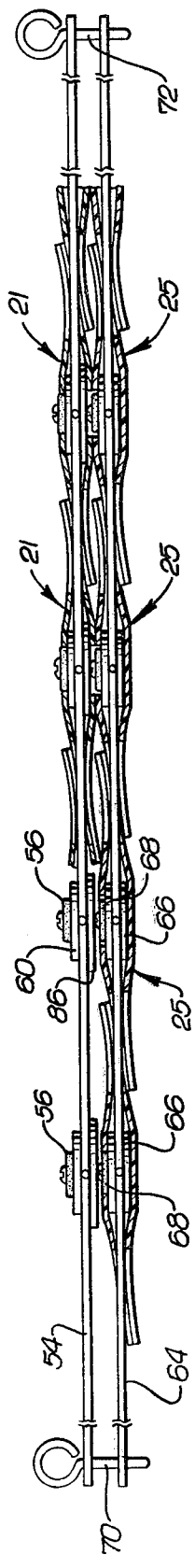
FIG. 6 is a side elevational view of the welding jig, the jigged baffle elements being shown in section along a plane corresponding to line 6—6 of FIG. 5.

The manner in which the baffle elements are assembled is shown in FIGS. 4, 5, 6 and 7. The mattress bag 10 as shown in FIG. 4 is formed by partially lap welding the top and bottom layers 14 and 16 along line 42 and 44 corresponding, in the present instance, to the foot and head of the bag. Access slits 46 and 48 are thus formed. Generally rectangular side pieces 50 and 52 close the ends of the tube formed by the lap welded top and bottom layers. The method of attachment is by heat welding in accordance with U.S. Pat. No. 3,753,819 to Carlos A. Mollura, entitled METHOD OF MAKING TUBULAR FLEXIBLE BAG WITH LAP WELDED ENDS, and in accordance with my copending Application Ser. No. 53,398 filed June 29, 1979, entitled METHOD OF MAKING BAFFLED LAP WELDED WATERBED MATTRESS BAG, now abandoned. The end pieces 50 and 52 are attached by first telescoping the tube over a floating die (not shown), turning the end pieces over the inwardly turned edges to form a one-to-one lap welded arrangement. Rows of baffle assemblies are attached in a manner now to be described.

The upper baffle elements 21, each comprising two circular layers welded together, are strung upon a jig 54, the number being sufficient to make up a row. The jig 54 is essentially a flat metal strip or skewer. The jig 54 enters between and exits through the plies of the baffle elements via the diametrically disposed notches 40. Adjacent baffle elements 21 overlap somewhat, their notches 40 more or less registering.

Each two ply baffle element 21 is located on the jig 54 by the aid of a circular register 56 that cooperates with the top hole 26 of the baffle element 21. The register 56 is attached to a cross piece 58 that extends across a ring die 60. The ring die 60, in turn, fits in and is attached at a mounting hole 62 in the jig 54 so that the ring die 50 projects both above and below the body of the skewer or jig 54.

The lower baffle elements 25 are likewise strung upon a skewer 64. The skewer 64 mounts ring dies 66 and, thereby, registers 68. The skewered upper baffle elements and lower baffle elements are positioned one above the other and in alignment by the aid of removable pins 70 and 72 at opposite ends. The jigged baffle elements 21 and 25 are inserted between the mattress layers 12 and 14, and the bag is positioned on a table 74 of a dielectric heating machine 76. The jigs, 54, 64 are positioned so that each baffle assembly and ring die 60, 66 fall between a pair of cylindrical die members 77 and 78. The lower die members are mounted on the bed 80 of the machine and project upwardly through access openings in the table 74. The upper die members 78 are attached directly to the head 82 of the machine. The top surface of the lower die members 77 are about flush with the surface of the table 74 so as not to interfere while the mattress bag is shifted into proper position.

When the head 82 closes, the plastic layers are clamped together. The dies 77, 78 of the machine and the ring dies 60 and 66 are electrically conductive and form plates of capacitors that are in series. Thus, the top surface of the cylindrical die 77 and the lower surface of the ring die 66 form plates of one capacitor, the dielectric being the two plastic layers; the opposed surfaces of ring dies 66 and 60 form plates of a second capacitor; and the upper surface of ring die 60 and the lower surface of cylindrical die 78 form the plates of a third capacitor. A high frequency potential applied across all of the die members causes heat to be generated in the dielectric materials, namely the plastic layers, causing heat welding.

The lower surface 84 of the upper ring die 60 has annular flanges 86 to ensure proper engagement of upper and lower ring dies notwithstanding a slight misalignment. Heat welding takes place simultaneously for all of the jigged baffle elements. The jigs 54 and 64 are carefully withdrawn from the welded baffle elements. The process is repeated until all of the baffle elements are installed. Finally, the slits 42 and 44 of the bag are closed using a separator (not shown) removable through the fill hole of the mattress bag, all in accordance with said U.S. Pat. No. 3,753,819. A 100% lap welded bag results.

The welds securing the baffle elements are, by virtue of the multiple or stacked arrangement, never subjected to stress due to overfilling or dynamic loading. A well baffled mattress bag results that has vastly reduced risk of leakage due to weld failures.

Intending to claim all novel, useful and unobvious features shown or described, I make the following claims:

1. A waterbed mattress bag having arrayed throughout substantially its entire operative area, a series of individual baffle assemblies; each of the baffle assemblies including a plurality of vertically stacked baffle elements, each baffle element comprising a two layer pancake like bladder movable from a flattened position to an axially extending biconical position, the baffle elements of each assembly being attached together at their central regions to form a bellows like arrangement; and means anchoring the baffle assemblies to the mattresses so that the assemblies are normally partially axially extended; the baffle elements being of sufficient diameter relative to the nominal mattress thickness as substantially to preclude the imposition of stress on the baffle elements due to excessive filling or dynamic loading.

2. The waterbed mattress as set forth in claim 1 in which said baffle assemblies are attached to the top and bottom layers of said waterbed mattress bag.

3. The waterbed mattress as set forth in claim 1 in which each of said baffle elements has slot means forming an opening to equalize pressure between the inside and the outside of the baffle elements.

4. A waterbed mattress bag having arrayed throughout substantially its entire operative area, a series of individual baffle assemblies; each of the baffle assemblies comprising a pair of open bladders attached to each other at the center and to the top and bottom mattress layers at the respective ends of the assemblies; said baffle assemblies being movable from a substantially flattened state to an extended state, said baffle bladders being of sufficient size relative to the nominal mattress thickness as substantially to preclude the imposition of stress on the baffle elements due to excessive filling or dynamic loading.

5. The waterbed mattress as set forth in claim 4, in which said bladders are each made as a pair of layers peripherally attached together whereby said baffle assemblies are easily flattened for shipment and storage of the mattress.

* * * * *